United States Patent

Tsuji et al.

Patent Number: 6,011,598
Date of Patent: Jan. 4, 2000

[54] DECODING START CONTROLLER, DECODER, AND DECODING SYSTEM

[75] Inventors: Yasunori Tsuji, Osaka; Takashi Urano, Chiba; Koichi Tsuchikane, Tokyo; Yasuhachi Hamamoto, Saitama, all of Japan

[73] Assignee: Sanyo Electric Co., Ltd., Osaka, Japan

[21] Appl. No.: 08/825,528

[22] Filed: Mar. 28, 1997

[30] Foreign Application Priority Data

Mar. 28, 1996 [JP] Japan .................................. 8-103961

[51] Int. Cl.[7] .................................................. H04N 7/26
[52] U.S. Cl. ........................... 348/845; 348/419; 348/423
[58] Field of Search .................................. 348/384, 390, 348/419, 423, 845; H04N 7/26

[56] References Cited

U.S. PATENT DOCUMENTS

| | | | |
|---|---|---|---|
| 5,686,963 | 11/1997 | Uz | 348/419 |
| 5,758,011 | 5/1998 | Fujinami | 386/98 |
| 5,764,293 | 6/1998 | Uz | 348/419 |
| 5,771,357 | 6/1998 | Kato | 709/247 |
| 5,793,431 | 8/1998 | Blanchard | 348/423 |
| 5,929,916 | 7/1999 | Legall | 348/419 |

*Primary Examiner*—Howard Britton
*Attorney, Agent, or Firm*—Armstrong, Westerman, Hattori, McLeland & Naughton

[57] ABSTRACT

A decoding start controller is capable of appropriately decoding pictures up to the final picture, even if the amount of the data stored in a bit-stream buffer is reduced, as a result of partial storage of the data in an internal local buffer. Further, the decoding start controller is capable of decoding extremely short bit-stream data. If completion information, which is sent from an input side of the bit-stream data and represents completion of input of the bit-stream data, is detected, a decoding start instruction signal is output to a variable-length decoder regardless of a value of VBV occupancy. In short, when the amount of the data stored in the bit-stream buffer connected to the decoder having the decoding start controller, is equal or greater than the value of VBV occupancy, the decoding start instruction signal will usually be sent to the variable-length decoder: namely, so-called decoding start control operation based on value of VBV occupancy. If the completion information is detected, the decoding start control operation based on the value of VBV occupancy is interrupted, and the decoding start instruction signal is output.

21 Claims, 6 Drawing Sheets

6,011,598

DECODING START CONTROLLER, DECODER, AND DECODING SYSTEM

BACKGROUND OF THE INVENTION

1. Field of the Invention

The present invention relates to a decoder and a decoding system, more particularly, to a decoding start controller for controlling timing at which the decoder and the decoding system commences decoding operation.

2. Description of the Related Art

MPEG (Moving Picture Experts Group) is already known as a standardized image encoding technique of compressing primarily moving picture data.

An LSI of an MPEG decoder determines decoding timing of each picture by comparing a value called VBV occupancy with the amount of bit-stream data stored in a bit-stream buffer. The value of VBV occupancy is determined by a vbv_delay signal which defines the decoding timing of the decoder. In short, the value of VBV occupancy obtained for each picture is compared with the amount of data stored in the bit-stream buffer. The decoding of the bit-stream data in commenced if the amount of the data stored in the bit-stream buffer is equal to or greater than the value of VBV occupancy.

In the case of the MPEG decoder's LSI, a portion of the bit-stream data may be stored in an internal local buffer within the LSI. As a result, the data stored in the bit-stream buffer is reduced in the amount corresponding to the amount of the data stored in the internal local buffer, which makes it impossible to carry out appropriate decoding of the bit-stream data.

More specifically, because the amount of the data stored in the bit-stream buffer becomes smaller than the occupancy value by the previously-described reduction, decoding of a picture, particularly, decoding of the picture at the end of the sequence, cannot be commenced in spite of the fact that a picture at the end of a certain sequence has already been sent to the bit-stream buffer. Further, even in a case where extremely short bit-stream data enters the MPEG decoder in place of the final picture, the amount of the data stored in the bit-stream buffer becomes smaller than the value of VBV of occupancy by the previously-described reduction, which in turn makes it impossible to commence decoding of the bit-stream data.

SUMMARY OF THE INVENTION

The present invention relates to a decoding start controller, the object of which is to provide a decoding start controller, a decoder, and a decoding system capable of appropriately decoding pictures up to the final picture even if an internal local buffer causes the amount of data stored in a bit-stream buffer to decrease, and capable of decoding extremely short bit-stream data.

According to a first aspect of the present invention, there is provided a decoding start controller which carries out decoding start control operation at the time of decoding of bit-stream image data, the improvement being characterized by the fact that decoding start control operation are executed according to a value of judgment calculated by use of time information for specifying decoding start timing and by use of a bit rate if completion information, which represents the completion of output of the bit-stream data at the sender of the bit-stream data, is not detected; whereas a decoding start instruction signal is output with regard to image data which is not yet decoded if the completion information is detected.

Therefore if the completion signal is detected, the decoding start instruction signal is output. Hence, it is possible to decode a picture at the end of the bit-stream or bit-stream data having an extremely short data length.

Particularly, the image data is image information in compliance with the MPEG standard. The decoding start control operation that are executed according to a value of judgment calculated by use of time information for specifying decoding start timing and by use of a bit rate, should preferably be decoding start control operation which are carried out according to the value of VBV occupancy. The value of judgment calculated by use of the time information specifying the decoding start timing and a bit rate, should preferably be the value of VBV occupancy. More preferably, the "time information specifying the decoding start timing" should preferably be a vbv_delay. As a result, even in the case of image data in compliance with the MPEG standard, it is possible to ensure decoding of the final picture at the and of the bit-stream data or decoding of bit-stream data having a short data length.

According to a second aspect of the present invention, there is provided a decoding start controller which carries out decoding start control operation at the time of decoding of bit-stream picture information, the improvement being characterized by comprising:

a detector for detecting completion information which represents the completion of output of the bit-stream data at the sender of the bit-stream data; and an output device that outputs a decoding start instruction signal on the basis of the decoding start control operation which are carried out according to time information for specifying decoding start timing and a bit rate, if the detector does not receive the completion information, or outputs decoding start instruction signal with regard to image data which is not yet decoded if the completion information is detected.

In this decoding start controller, the detector detects the completion signal. If the receipt of the completion signal is detected, the output device outputs a decoding start instruction signal with regard to image data which s not yet decoded. Consequently, if the amount of data stored in the bit-stream buffer is smaller than the value of VBV occupancy, the image data can be decoded, which enables decoding of the final picture at the end of the bit-stream or decoding of bit-stream data having a short data length.

If the detector does not detect the completion information, it is desirable to output the decoding start instruction signal on the basis of the decoding start control operation carried out according to the value of judgment calculated by use of the time information for specifying decoding start timing and by use of a bit rate. In normal times, where the decoding start control operation are being carried out according to the value calculated by use of the time information for specifying decoding start timing and by use of a bit rate, it is possible to decode the picture at the end of the bit-stream data or bit-stream data having a short data length.

The image data should preferably be image information in compliance with the MPEG standard, and the decoding start control operation that are executed according to a value of judgment calculated by use of time information for specifying decoding start timing and by use of a bit rate, should preferably be decoding start control operation carried out according to the value of VBV occupancy. The value if judgment calculated by use of the time information specifying the decoding start timing and a bit rate, should preferably be the value of VBV occupancy. The time information specifying the decoding start timing should preferably be a vbv_delay. As a result, even in a case where the decoding start control operation are carried out according to the value of VBV occupancy with regard to image data complying with the MPEG standard, it is possible to ensure decoding of a picture at the end of the bit-stream data or decoding of bit-stream data having a short data length.

According to a third aspect of the present invention, there is provided decoder which decodes bit-stream image data, the improvement being characterized by comprising:

a variable-length decoding device which carries out variable-length decoding with regard to the bit-stream data; and a controller which sends a decoding start instruction signal to the variable-length decoding device with regard to predetermined data of the bit-stream data if completion information representing completion of output of the bit-stream data at the sender is not detected.

In this decoder, if the completion information is detected, the decoding start instruction signal is sent to the variable-length decoder with regard to the image data before it is subjected to the variable-length decoding operation. The variable-length decoder performs decoding operation according to the decoding start instruction signal. Therefore, it is possible to ensure decoding of a picture at the end of the bit-stream data or decoding of bit-stream data having a short data length.

If the detector does not detect the completion information, the controller should preferably send the decoding start instruction signal to the variable-length decoder on the basis of the decoding start control operation carried out according to the value of judgment calculated by use of the time information for specifying decoding start timing and by use of a bit rate. In normal times, where the decoding start control operation are being carried out according to the value calculated by use of the time information for specifying decoding start timing and by use of a bit rate, it is possible to decode the picture at the end of the bit-stream data or bit-stream data having a short data length.

According to a fourth aspect of the present invention, there is provided a decoding start controller which performs decoding start control operation when bit-stream data of image information is decoded, the improvement being characterized by comprising:

memory for storing a reduction of a value of judgment calculated by use of time information for specifying decoding start timing and by use of a bit rate;

a calculator which calculates the value of judgment calculated by use of time information for specifying decoding start timing and by use of a bit rate with regard to predetermined data of the bit-stream data, and which calculates a corrected value by subtracting the reduction from the value of judgment calculated by use of the time information for specifying the decoding start timing and by use of a bit rate;

a comparator which compares the corrected value with the amount of data stored in the bit-stream buffer connected to the decoder provided with the decoding start signal controller; and an output device which outputs a decoding start instruction signal with regard to the predetermined data on the basis of comparison results produced by the comparator.

As a result, a corrected value is calculated by subtracting the reduction from the value that is calculated by use of the time information for specifying the decoding start timing and by use of a bit rate. The thus-calculated corrected value is compared with the amount of data stored in the bit-stream buffer. Since the decoding start control operation are carried out on the basis of the result of such comparison, it is also possible to decode the picture at the end of the bit-stream data and bit-stream data having a shorter data length.

DESCRIPTION OF THE PREFERRED EMBODIMENTS

Figure 1:
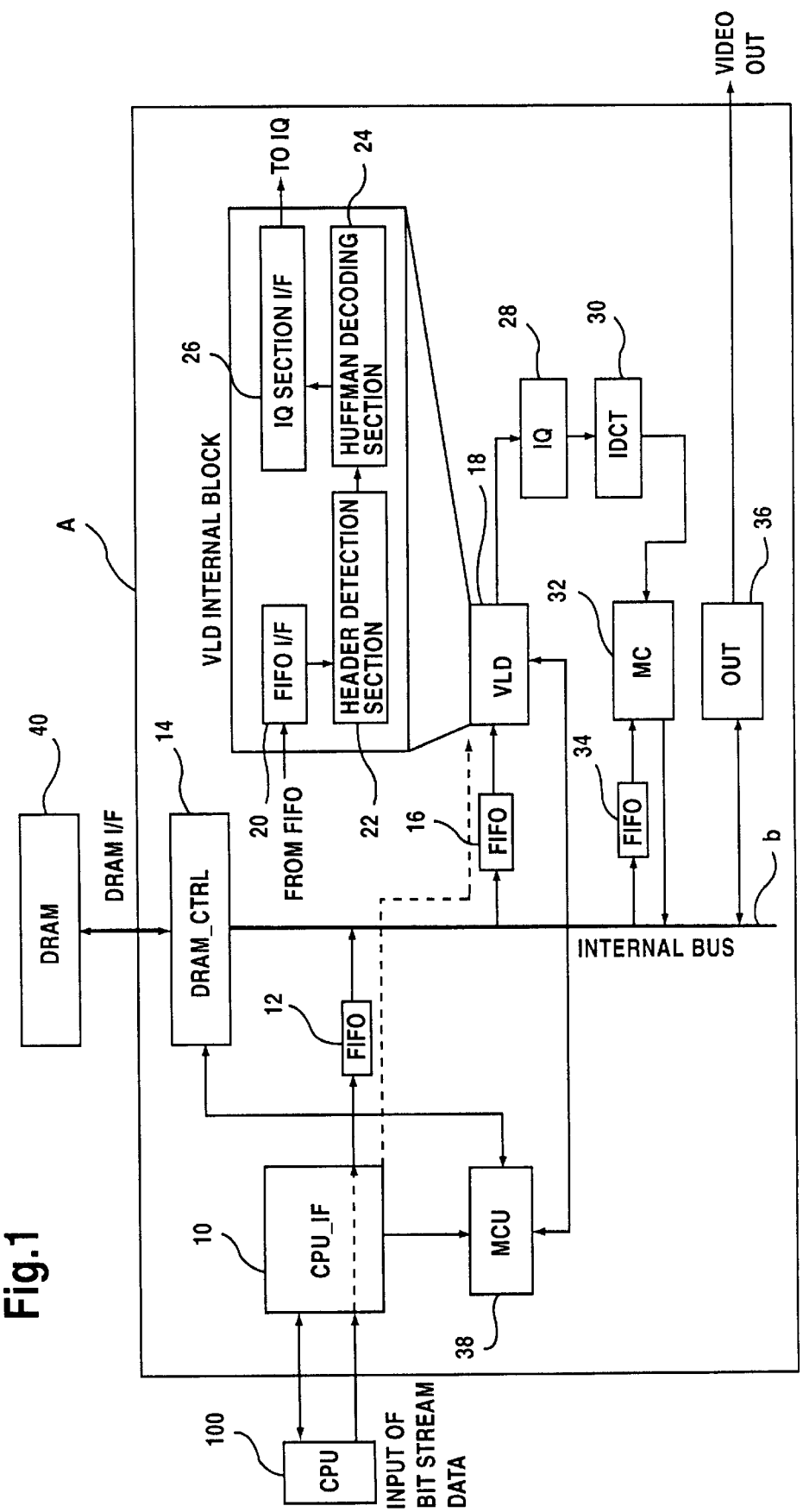
FIG. 1 is a block diagram illustrating the configuration of a decoder according to an embodiment of the present invention.

With reference to the accompanying drawings, preferred embodiments of the present invention will be described hereinbelow. As illustrated in FIG. 1, a decoder A according to a first embodiment is comprised of a CPU interface (CPU IF) 10, a FIFO buffer (FIFO) 12, a DRAM controller (DRAM CTRL) 14, a FIFO buffer (FIFO) 16, a variable-length decoder (VLD) 18, an inverse quantizing device (IQ) 28, an inverse DCT converter 30, a motion compensation circuit circuit (MC) 32, a FIFO buffer (FIFO) 34, an output circuit (OUT) 36, and a main control unit (MCU) 38. Further, DRAM 40 is connected to the decoder A as a bit-stream buffer, and a DRAM controller 14 of the decoder A is connected to the DRAM 40 through a DRAM interface (DRAM I/F). The decoder A is in compliance with the MPEG2 standard.

The CPU interface 10 is connected to an external CPU 100 and receives bit-stream input data from the outside.

The FIFO buffer 12 acts as a buffer in the same way as do the FIFO buffers 16 and 34. The FIFO buffer 12 is connected between the CPU interface 10 and a bus "b." The FIFO buffer 16 is connected between the bus "b" and the variable-length decoder 18, and the FIFO buffer 34 is connected between the bus "b" and the motion compensation circuit 32. The FIFO buffers 12, 16, and 34 produce outputs in the order in which they receive data.

The DRAM controller 14 controls the writing of data to, or reading of data from the DRAM 40; e.g., it monitors the amount of the data stored in the DRAM 40. The DRAM controller 14 is connected to the bus "b." In short, the DRAM controller 14 acts as a detection circuit for detecting the amount of data stored in tho bit-stream buffer.

The variable-length decoder 18 detects a header of the bit-stream data and decodes a variable-length code. As illustrated in FIG. 1, the variable-length decoder 18 is comprised of a FIFO interface (FIFO I/F) 20, a header detection circuit 22, a Huffman decoder 24, and an inverse quantization interface (IQ section I/F) 26. The FIFO interface (FIFO I/F) 20 controls the interface between the FIFO buffer 16 and the header detection circuit 22. Further, the header detection circuit 22 detects a header of the bit-stream data. The Huffman decoder 24 decodes a Huffman code. Further, the inverse quantization interface (IQ section IF) 26 controls the interface between the Huffman decoder 24 and the inverse quantizing device 28.

The inverse quantizing device 28 inversely quantizes the bit-stream data; more specifically, it calculates a DCT coefficient by multiplying a quantized value of the bit-stream data by a quantizing step. The inverse DCT converter 30 processes the DCT coefficient calculated by the inverse quantizing device 28 by performing DCT inverse conversion processing. The motion compensation circuit 32 compensates for motion of the picture. More specifically, the motion compensation circuit 32 cuts and extracts an image block specified by motion vectors from a reference frame and adds the result of DCT inverse conversion to the thus-extracted image block. Furthermore, the output circuit 36 output the decoded image data in the form of a video.

The main control unit 38 controls the operation of each section of the decoder A. Further, when the CPU interface 10 receives completion information from the external CPU 100, the main control unit 38 interrupts the decoding start control operations which are carried out according to the value of VBV occupancy. The completion information represents that completion of output of the bit-stream data to the decoder A. More specifically, the completion information represents completion of input of the bit-stream data to the decoder A from the CPU 100 that is the input side of the bit-stream data. The completion information is formed from predetermined binary-coded data. The main control unit 38 acts as a control section and a decoding start controller, as well.

Figure 2:
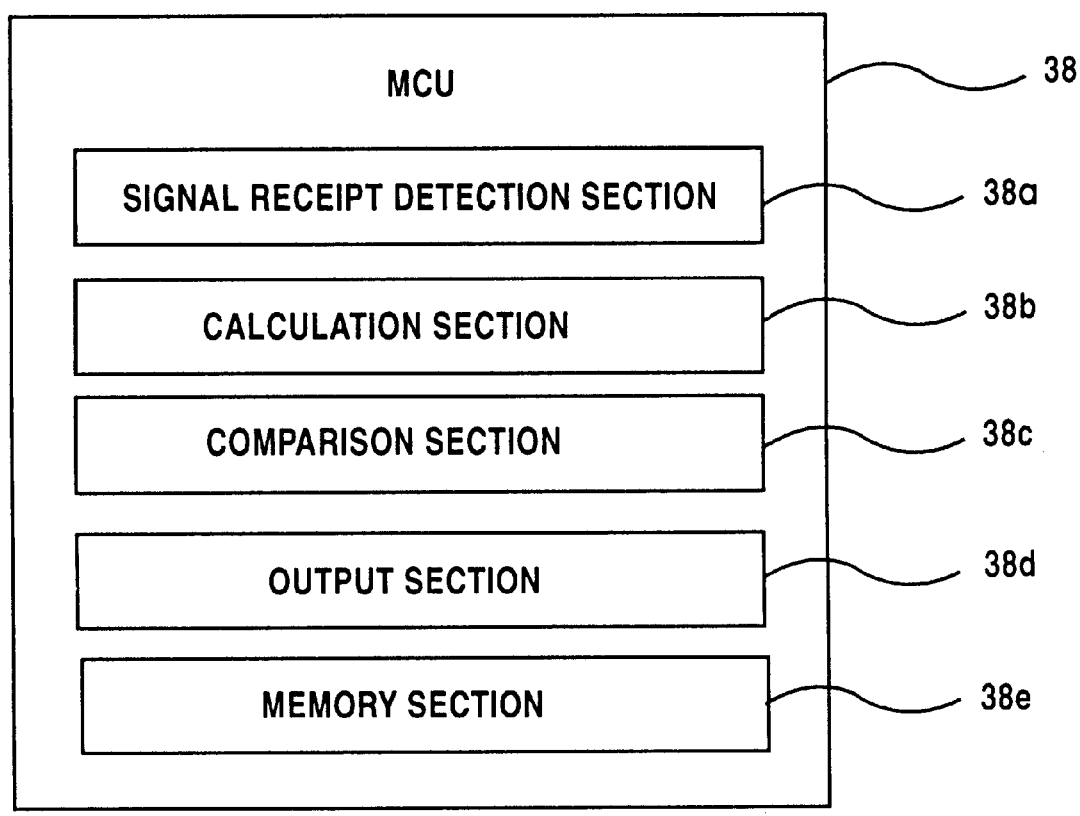
FIG. 2 is a block diagram illustrating the configuration of a main control unit.

For example, as illustrated in FIG. 2, the main control unit 38 is comprised of a signal receipt detection section 38a, a calculation section 38b, a comparison section 38c, an output section 38d, and a memory section 38e. The signal receipt detection section 38a detects the arrival of the completion signal, and the calculation section 38b calculates the value of VBV occupancy. More specifically, the calculation section 38b calculates the value of VBV occupancy from the bit-stream data using a bit rate of the bit-stream data and the value of vbv_delay. The value of vbv_delay designates time information which determines decoding start timing. More specifically, the value of vbv_delay has parts, one of the these parts is to designate the time required to fill the bit-stream buffer until the data amount which is necessary for start of decoding with regard to certain image data. The vbv_delay is used to set the value of VBV occupancy at the start of decoding bit-stream data, so that the decoder's buffer does not overflow or underflow. The value of VBV occupancy corresponds to the value of judgment calculated by use of time information for defining decoding start timing and by use of a bit rate. The certain image data represents data in frame units in a case where the picture has a frame structure. In contrast, if the picture has a field structure, the certain image data represents data in field units. The value of vbv_delay is provided frame by frame in the case of the picture having a frame structure. In contrast, if the picture has a field structure, the value of vbv_delay is provided field by field. Alternatively, the value of vbv_delay may be provided picture by picture.

Further, the output section 38c outputs a decoding start instruction signal to the variable-length decoder 18, and the memory section 38e stores data on the decoding start instruction signal to be output.

The DRAM 40 is a bit-stream buffer for temporarily storing bit-stream image data and has a plurality of frame memory features, as well.

The operation of the decoder A having the previously described configuration will be described.

First, bit-stream data enters the decoder A from the outside. More specifically, bit-stream data enters the decoder A through the CPU interface 10, and the thus-entered bit-stream data is temporarily written into the DRAM 40 through the FIFO buffer 12 and the DRAM controller 14. Subsequently, the bit-stream data is read from the DRAM 40 by the DRAM controller 14, and the thus-read bit-stream data is pre-fetched by the FIFO buffer 16.

A variable-length code of the bit-stream data is decoded by the variable-length decoder 18. At this time, the timing at which the decoding of the variable-length code is commenced, is specified by decoding control operation based on the value of VBV occupancy. In short, the main control unit 38 compares the value of VBV occupancy with the amount of the data stored in the DRAM 40 with regard to predetermined data of the bit-stream data. If the amount of the data snored in the DRAM 40 becomes equal to or greater than the value of VBV occupancy, the main control unit 38 sends a decoding start instruction signal to the variable-length decoder 18 so as to instruct it to start decoding operation. The predetermined data of the bit-stream data is image data in picture, frame, or field units. The previously-described comparison operation is carried out in any of the units. Since the vbv_delay is stored in a picture header, the image information is processed for each image data assigned a picture header.

The bit-stream data subjected to the variable-length decoding operation is further inversely quantized by the inverse quantization device 28. The thus-quantized data is subjected to inverse DCT conversion by the inverse DCT converter 30, and the DCT-converted data is subjected to motion compensation by the motion compensation circuit 32. At predetermined timing, the output circuit 36 then outputs the data in the form of a video.

The decoding start control based on the value of VBV occupancy will be described in more detail. First, the value of VBV occupancy is represented by the following equation:

$$VBV\ \text{occupancy} = vbv\_delay \times (bit\ rate/90000)$$

The value of vbv_delay is written in a picture header of the bit-stream data. In short, in the case of the picture having a frame structure, the vbv_delay is written into the picture header frame by frame. In contrast, in the case of a picture has a field structure, the vbv_delay is written into the picture header field by field. The bit rate is written in a sequence header and a sequence extension (MPEG 2) of the sequence. For this reason, the variable-length decoder 18 reads the bit rate from the sequence header and the sequence extension (in the case of MPEG 2) by processing the header of the bit-stream. Further, the variable-length, decoder 18 reads the-value of vbv_delay from the picture header of each picture and sends the thus-read value of vbv_delay and the bit rate to the main control unit 38.

In addition, the main control unit 38 calculates the value of VBV occupancy according to the Previously-described equation. In more detail, this calculation is performed by the calculation section 38b. The main control unit 38 sequentially receives information on the amount of the data stored in the DRAM 40 from the DRAM controller 14 and then compares the value of VBV occupancy with the amount of the data stored in the DRAM 40. If the amount of the data stored in the DRAM 40 is equal to or greater than the value of VBV occupancy, the main control unit 38 sends the decoding start instruction signal to the variable-length decoder 18. The variable-length decoder 18 commences decoding of the bit-stream data according to the decoding start instruction signal received from the main control unit 38. In other words, the image data stored in the DRAM 40 is input to the FIFO buffer 16 and the variable-length decoding starts with regard to the image data by the variable-length decoder 18.

When the value of VBV occupancy is calculated, a portion of the bit-stream data is stored in the internal local buffer. Therefore, the data stored in the DRAM 40 is reduced in the amount corresponding to the amount of the thus-stored bit-stream data. The internal local buffer corresponds to the FIFO buffer 16 and the FIFO interface 20.

As a result of the reduction in the amount of the data stored in the DRAM 40 the amount of the data stored in the DRAM 40 becomes smaller than the value of VBV occupancy, which may in turn prevent commencement of the decoding operation. To prevent this problem, at the point in time which the completion information representing the completion of output of the bit-stream data to the decoder A from the CPU 100 enters the decoder A, the decoding operation can be commenced by outputting the decoding start instruction signal to the variable-length decoder 18. When the variable-length decoder 18 receives the decoding start instruction signal, the variable-length decoder 18 starts decoding regardless of the value of the VBV occupancy. In other words, the image data stored in the DRAM 40 is input to the FIFO buffer 16 and the variable-length decoding starts with regard to the image data by the variable-length decoder 18.

Figure 6:
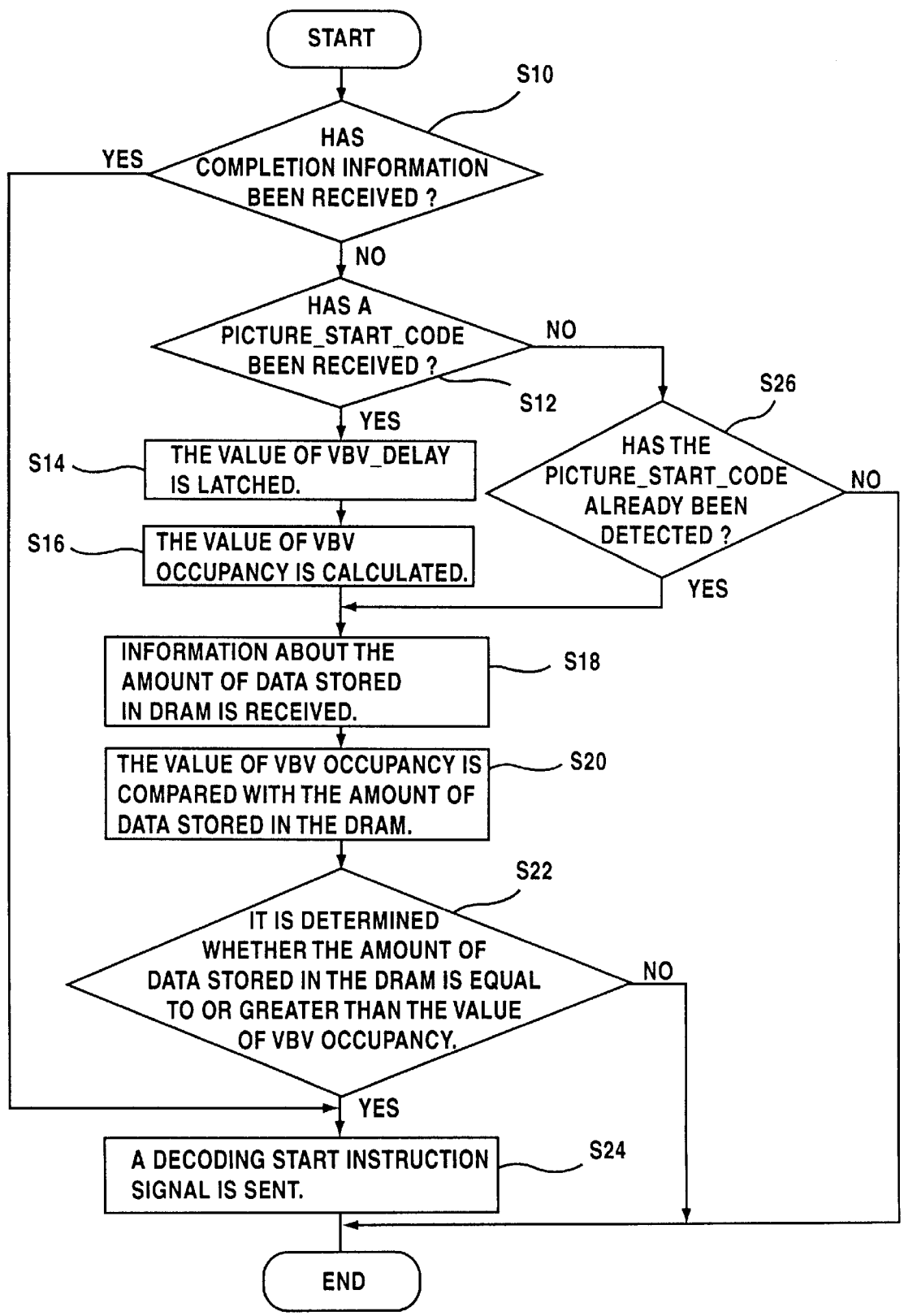
FIG. 6 is a flowchart for explaining the operation of a main control unit.

The operation of the main control unit 38 is represented by a flowchart as that is provided in FIG. 6.

It is determined whether or not the main control unit 38 received the completion information through the CPU interface 10 (S10). If this is not the case, it is determined whether or not a picture start code is detected (S12) If the picture start code is detected, the vbv_delay is read from the picture header (S14), and the value of VBV occupancy is calculated (S16). The information about the amount of data stored in the DRAM 40 is received from the DRAM controller 14 (S18). The value of VBV occupancy is compared with the amount of data stored in the DRAM 40 (S20). It is then determined whether the amount of data stored in the DRAM 40 is equal to or greater than the value of VBV occupancy (S22). If the amount of data stored in the DRAM 40 is equal to or greater than the value of VBV occupancy, a decoding start instruction signal is output (S24). In contrast, if the amount of data stored in the DRAM 40 is smaller than the value of VBV occupancy, the processing is terminated. If the picture start code is not detected in step S12, it is determined whether or not the picture start code has already been detected (S26). If the picture start code has already been detected, the processing then returns to step S18, and the same processing as that previously described is performed. If the picture start code has not been detected yet, the processing will be terminated. If the completion information is received in step S10, the decoding start instruction signal is sent to the variable-length decoder 18 irrespective of the value of VBV occupancy (S24). The processing illustrated in FIG. 6 is carried out in units of data which the variable-length decoder 18 processes at a time.

Figure 3:
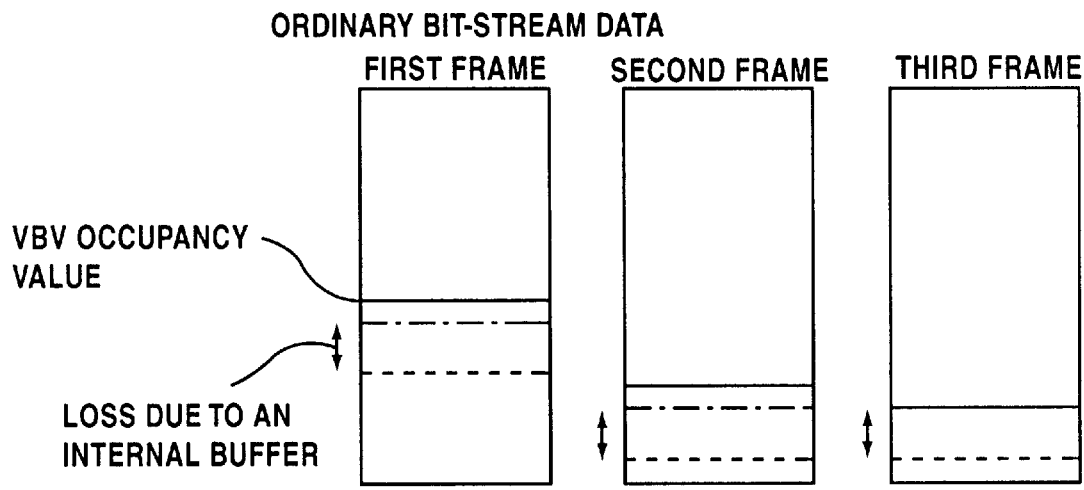
FIG. 3 is a schematic representation of bit-stream data for explaining the operation of a decoder of the present embodiment when it decodes ordinary bit-stream data.

The foregoing operations will be described with reference to bit-stream data consisting of image data; namely, the first frame to the third frame, provided in FIG. 3. In FIG. 3, the length of the overall frame designates the volume of the DRAM 40. A horizontal dotted line designates the amount of the data stored in each frame of the DRAM 40 after it is reduced. A horizontal dashed line designates the amount of the data in each frame of the DRAM 40 before it is reduced, and a horizontal solid line designates the value of VBV occupancy.

At the time of decoding of the image data on the first frame, the amount of the data stored in the DRAM 40 is smaller than the value of VBV occupancy at the point in to me which the image data on the first frame enters the DRAM 40. Subsequently the entry of the data regarding the second frame into the DRAM 40 causes the amount of the data stored in the DRAM 40 to increase so as to become equal to or to exceed the value of VBV occupancy. Therefore, a decoding start instruction signal is issued with regard to the image data on the first frame.

Even at the time of decoding of the image data on the second frame, the entry of data on the third frame into the DRAM 40 causes the amount of the data stored in the DRAM 40 to increase. The decoding start instruction signal is issued with regard to the image data on the second frame at the point in time which the amount of the data stored in the DRAM 40 has become equal to or exceeded the value of VBV occupancy.

Figure 5:
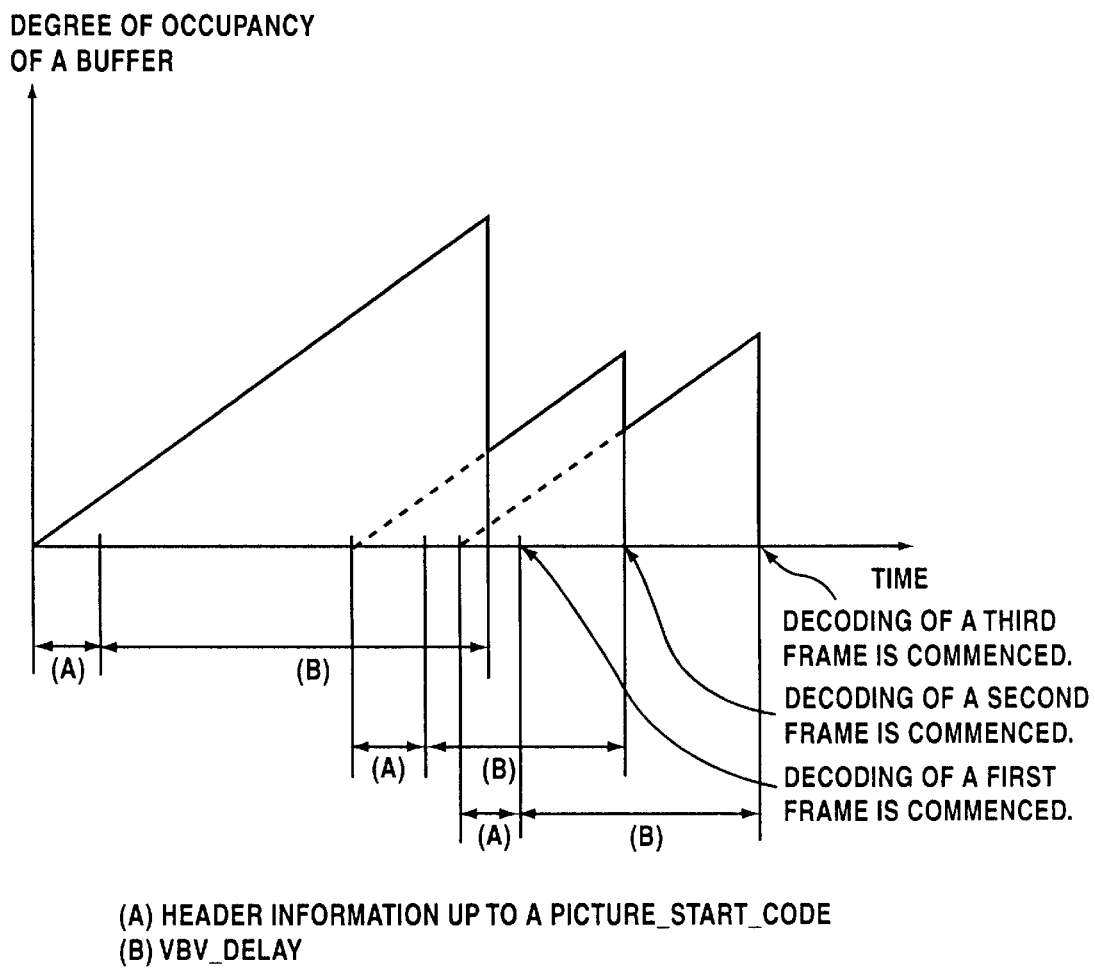
FIG. 5 is a graph illustrating the relationship between time and the proportion of occupancy of a buffer in the decoder of the present embodiment.

At the time of decoding the image data on the third frame, no data follows that image data, and hence the amount of the stored data of the DRAM 40 remains smaller than the value of VBV occupancy, as a result of partial storage of the data in the internal local buffer. If the completion information, which represents the completion of output of the bit-stream data to the decoder A from the CPU 100 that is the input side of the bit-stream data, is input to the decoder A, the decoding start instruction signal is output to the variable-length decoder 18 at this point in time. In other words, if the transmission of the bit-stream data from the input side is completed, the completion information enters the decoder A from the CPU 100 on the input side. If the main control unit 38 detects the completion information through the CPU interface 10, the decoding start control operations which are carried out according to the value of VBV occupancy are interrupted. The decoding start instruction signal is output to the variable-length decoder 18. Upon receipt of the decoding start instruction signal, the variable-length decoder 18 commences decoding of the third frame. At this time, there arises a transition in the amount of the stored data of the DRAM 40 as illustrated in FIG. 5. Here, the vbv_delay designates the time provided in FIG. 5.

As has been described above, the decoder of the present invention is capable of appropriately commencing decoding of bit-stream data even if the amount of the data stored in the bit-stream buffer is reduced, as a result of partial storage of the bit-stream data in the internal local buffer other than the bit-stream buffer. Even in the case of the final frame, the bit-stream data can be appropriately decoded regardless of the value of VBV occupancy.

An explanation will now be given of the case of bit-stream data having an extremely short data length. The following descriptions are based on the assumption that the bit-stream data has an extremely short data length and is comprised of image data from the first to third frames.

Figure 4:
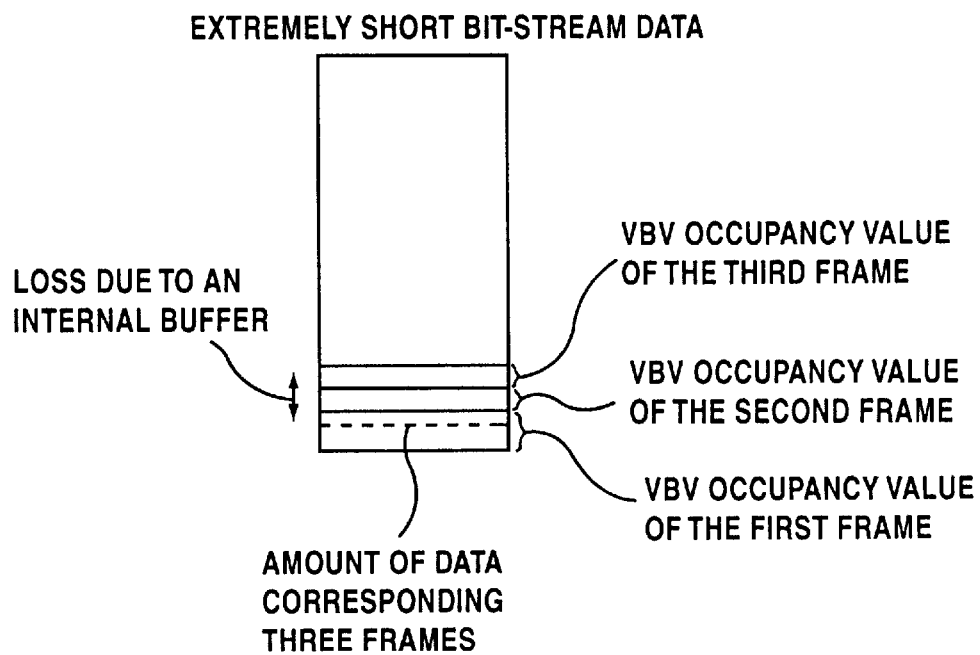
FIG. 4 is a schematic representation of bit-stream data for explaining the operation of the decoder of the present embodiment when it decodes extremely short bit-stream data.

As illustrated in FIG. 4, even when data corresponding to the three frames enters the DRAM 40, as a result of partial storage of the data in the internal local buffer the amount of the data stored In the DRAM 40 cannot exceed the value of VBV occupancy of each picture. The length of the overall frame provided in FIG. 4 designates the amount of the data stored in the DRAM 40, and a horizontal dotted line designates the amount of the data corresponding to the three frames stored in the DRAM 40 after a portion of the data has been stored in the internal local buffer. A horizontal solid line designates the value of VBV occupancy.

If the completion information which represents the completion of input of the bit-stream data enters the decoder A from the output side of the bit-stream data, at this time the decoding start instruction signal is output to the variable-length decoder 18. In this event, the main control unit 38 sends the decoding start instruction to the variable-length decoder 18 for each picture. Accordingly, the decoding start instruction signal corresponding to the three frames are output to the variable-length output decoder 18.

As described above, even in the case of bit-stream data having an extremely short data length, the data can be decoded appropriately regardless of the value of VBV occupancy.

Even in the case of a picture having a field structure, the previously-described operations are carried out. More specifically, a picture header is provided in field by field, and the vbv__delay is written into this picture header. Hence, the value of VBV occupancy is calculated from the vbv__delay and a bit rate. The thus-calculated value of VBV occupancy is compared with the amount of data stored in the DRAM 40, whereby decoding start control operations are executed. If the decoder A has received the completion information from the CPU 100, the MCU 38 outputs the decoding start instruction signal irrespective of the value of VBV occupancy.

Although the previous descriptions have been made on the assumption that the decoder A is in compliance with the MPEG2 standard, the present invention is not limited to thin case. The decoder A may comply with the MPEG1 standard. In the case of the decoder A complying with the MPEG1 standard, a picture header is provided in each picture. Since the vbv__delay is written into the picture header, the value of VBV occupancy is calculated from the vbv__delay and a bit rate. The thus-calculated value of VBV occupancy is compared with the amount of data stored in the DRAM 40, whereby decoding start control operations are carried out. If the decoder A has received the completion information from the CPU 100, the main control unit 38 outputs the decoding start instruction signal irrespective of the value of VBV occupancy.

Further, although the previous embodiment has been described on the assumption that the completion information is sent from the CPU 100, the present invention is not limited to this embodiment.

A second embodiment of the present invention will be described hereinbelow. In contrast to the previous embodiment, the decoding start control operations are not carried out by detection of the completion signal in the second embodiment. A value is calculated by subtracting the amount of data stored in an internal local buffer from the value of VBV occupancy, and decoding start control operations are carried out using the thus-calculated value as a new value of VBV occupancy.

Specifically, the configuration of the decoder of the second embodiment is illustrated in FIG. 1. Internally stored data quantity information which represents the amount of data stored in the internal local buffer is previously stored in the main control unit 38. More specifically, the internally stored data quantity information is stored in a memory section 38e. The internally stored data quantity information represents the amount of data which is reduced by the internal local buffer of the bit-stream buffer. As in the previous embodiment, the main control unit 38 calculates the value of VBV occupancy according to the following equation $$VBV\ occupancy = vbv\_delay \times (bit\ rate/90000).$$

The amount of data represented by the internally stored data quantity information is subtracted from the thus-calculated value of VBV occupancy, whereby a new value of VBV occupancy is calculated. The previous calculation is performed by a calculation section 38b. The thus-calculated new value of VBV occupancy is used as the corrected value of VBV occupancy. This corrected value of VBV occupancy serves as a corrected value.

The main control unit 38 sequentially receives information about the quantity of data stored in the DRAM 40 from the DRAM controller 14. The main control unit 38 compares the corrected value of VBV occupancy with the amount of data stored in the DRAM 40. If the amount of data stored in the DRAM 40 is equal to or greater than the corrected value of VBV occupancy, the main control unit 38 sends the decoding start instruction signal to the variable-length decoder 18. The comparison operations are performed by a comparison section 38c. An output section 38d outputs the decoding start instruction signal. The variable-length decoder 18 commences decoding operations according to the decoding start instruction signal received from the main control unit 38.

Figure 7:
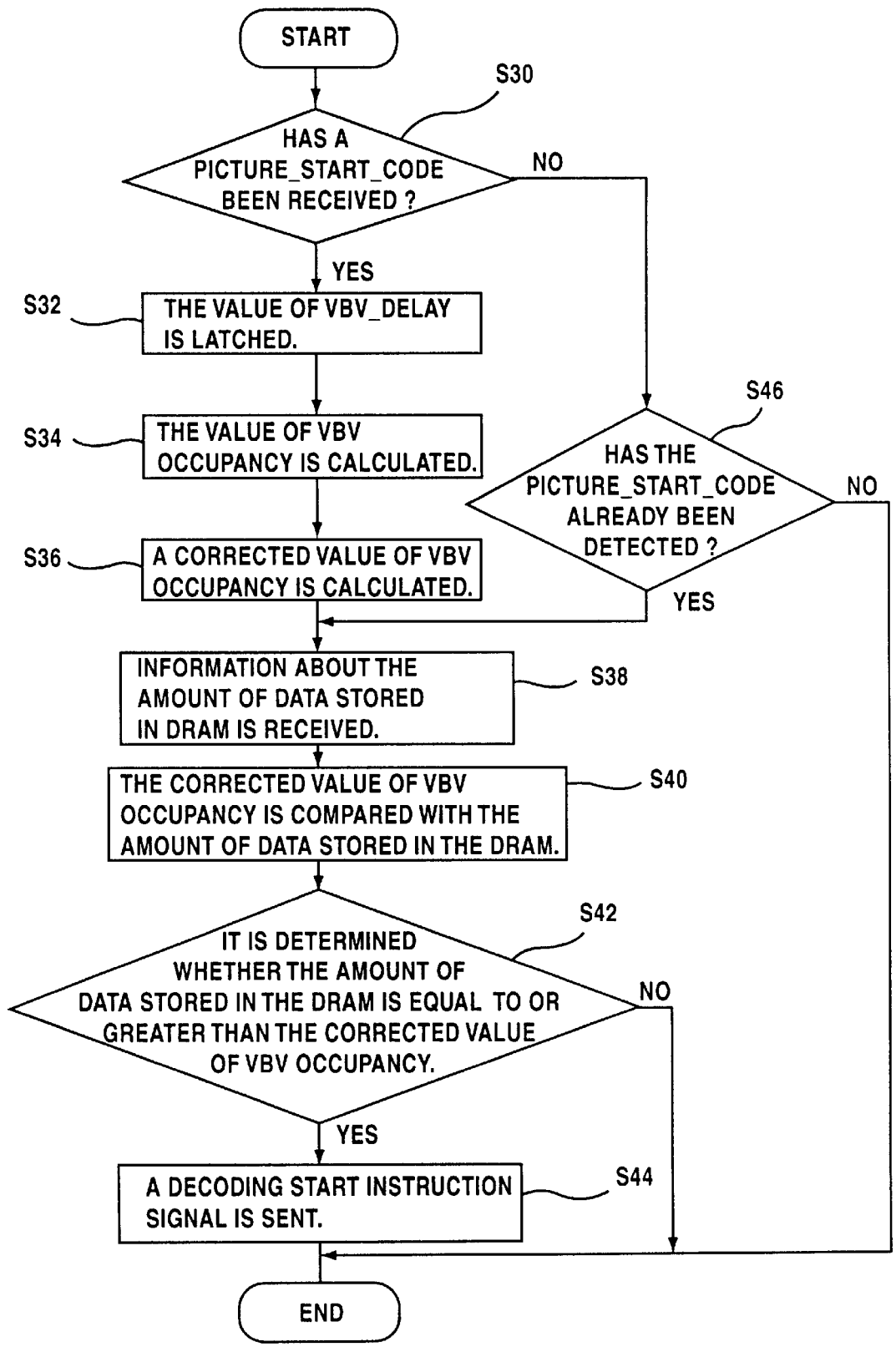
FIG. 7 is a flowchart for explaining the operation of the main control unit.

In short, the operation of the main control unit 38 can be represented by a flowchart such as that provided in FIG. 7.

The main control unfit 38 determines whether or not the picture start code has been detected (S30). If the picture start code has been detected, the value of vbv__delay is read from the picture header (S32). The value of VBV occupancy is calculated (S34). A corrected value of VBV occupancy is calculated by subtracting the amount of data represented by the internally stored data quantity information from the value of VBV occupancy (S36). The amount of data stored in the DRAM 40 is received from the DRAM controller 14 (S38). Subsequently, the corrected value of VBV occupancy is compared with the amount of data stored in the DRAM 40 (S40). It is then determined whether the amount of data stored in the DRAM 40 is greater than or equal to the corrected value of VBV occupancy (S42). If the amount of data stored in the DRAM 40 is equal to or greater than the corrected value of VBV occupancy, the decoding start instruction signal is output to the variable-length decoder 18 (S44). In contrast, if the amount of data stored in the DRAM 40 is smaller than the corrected value of VBV occupancy, the processing is terminated. If the picture start code is not detected in step S30, it is determined whether or not the picture start code has already been detected (S46). If the picture start code has already been detected, the processing then proceeds to step S38, and the same processing as that is carried out in stop S38 is performed. In contrast, if the picture start code has not been detected yet, the processing is terminated. The processing provided in FIG. 7 is carried out in units of data which the variable-length decoder 18 processes at a time.

The foregoing operations will be described with reference to bit-stream data consisting of image data; namely, the first frame to the third frame. In the case of the third frame illustrated in FIG. 3, the amount of data stored in the DRAM 40 becomes equal to or greater than the corrected value of VBV occupancy, it is possible to carry out decoding start operations even with regard to the final frame. In this case, as illustrated in FIG. 3, the corrected value of VBV occupancy reaches the lower level designated by a dotted line which is lower than the value of VBV occupancy by the loss caused by the internal buffer.

Even in the case of bit-stream data having an extremely short data length, the amount of data stored in the DRAM 40 which corresponds to three frames becomes equal to or greater than the corrected value of VBV occupancy. As a result, it is possible to carry out decoding start processing operations with regard to the data corresponding to three frames. In this case, the corrected value of VBV occupancy reaches the level designated by a dotted line which is lower than the value of VBV occupancy by the loss caused by the internal buffer.

As has been described above, according to the decoder of the present embodiment, even if the amount of data stored in the bit-stream buffer is reduced as a result of temporary storage of partial the bit-stream data in the internal local buffer other than the bit-stream buffer, decoding start control operations can be carried out appropriately. Therefore, it is possible to appropriately decode the final frame or bit-stream data having an extremely short data length.

Further, even in the case of a picture having a field structure, the same operations as those previously performed are carried out. In short, a picture header is provided field by field, and vbv_delay is written into the picture header. Therefore, the value of VBV occupancy is calculated from the vbv_delay and a bit rate, and the corrected value of VBV occupancy is calculated from the value of VBV occupancy. The corrected value of VBV occupancy is compared with the amount of data stored in the DRAM 40, whereby decoding start control operations are carried out.

Although the previous embodiment has been described on the assumption that the decoder A is in compliance with the MPEG 2 standard, the present invention is not limited to this embodiment. For example, the decoder A may comply with the MPEG1 standard. Further, in each of the previous embodiments, the decoder is not limited to be in compliance with the MPEG standard, the decoder may comply with another standard.

While the present invention has been described with reference to an illustrative embodiment, the previous descriptions are not intended to be construed in a limiting sense. Various modifications of the illustrative embodiment, as well as other embodiments of the present invention, will be apparent to those who are versed in the art upon reference to the descriptions. It is, therefore, contemplated that the appended claims will cover any such modifications or embodiments as fall within the true scope of the present invention.

We claim:

1. A decoding start controller which carries out decoding start control operation at the time of decoding of bit-stream image data, the improvement being characterized by the fact that decoding start control operation are executed according to a value of judgment calculated by use of time information for specifying decoding start timing and by use of a bit rate unless completion information representing the completion of output of the bit-stream data at the sender of the bit-stream data, is detected; whereas a decoding start instruction signal is output with regard to image data which is not yet decoded if the completion information is detected.

2. The decoding start controller as defined in claim 1, wherein, if the data stored in a bit stream buffer connected to a decoder provided with the decoding start controller is equal to or greater than the value of judgment calculated by use of the time information for specifying the decoding start timing and by use of the bit rate, a decoding start instruction signal is output; and if the completion information is received, the decoding start control operation carried out according to the value of judgment calculated by use of the time information for specifying the decoding start timing and by use of the bit rate are interrupted, and the decoding start instruction signal is output regardless of the amount of data stored in the bit-stream buffer.

3. The decoding start controller as defined in claim 1, wherein the image data is image information in compliance with the MPEG standard;

the decoding start control operation that are executed according to a value of judgment calculated by use of time information for specifying decoding start timing and by use of a bit rate, are decoding start control operation which are carried out according to the value of VBV occupancy;

the value of judgment calculated by use of the time information specifying the decoding start timing and a bit rate is the value of VBV occupancy; and the time information specifying the decoding start timing is a vbv_delay.

4. A decoding start controller which carries out decoding start control operation at the time of decoding of bit-stream picture information, the improvement being characterized by comprising:

a detector for detecting completion information which represents the completion of output of the bit-stream data at the sender of the bit-stream data; and an output device which outputs a decoding start instruction with regard to the image data before it is encoded if the detector detects the completion information.

5. The decoding start controller as defined in claim 4, wherein if the detector does not detect the completion information, the output device outputs a decoding start instruction signal on the basis of the decoding start control operation that are executed according to the value of judgment calculated by use of time information for specifying decoding start timing and by use of a bit rate.

6. The decoding start controller as defined in claim 4, wherein the image data is in compliance with the MPEG standard.

7. The decoding start controller as defined in claim 5, further comprising:

a calculator for calculating the value of judgment which is computed by use of the time information for specifying the decoding start timing and by use of a bit rate; and a comparator which compares the value calculated by the calculator using the time information for specifying the decoding start timing and the bit rate, with the amount of data stored in the bit-stream buffer connected to a decoder provided with the decoding start controller; and wherein if the amount of data stored in the bit-stream buffer is greater than or equal to the value of judgment calculated by use of the time information for specifying decoding start timing and by use of a bit rate a decoding start instruction signal is output.

8. The decoding start controller as defined in claim 5, wherein the image data is image information in compliance with the MPEG standard;

the decoding start control operation that are executed according to a value of judgment calculated by use of time information for specifying decoding start timing and by use of a bit rate, are decoding start control operation which are carried out according to the value of VBV occupancy;

the value of judgment calculated by use of the time information specifying the decoding start timing and a bit rate, is the value of VBV occupancy; and the time information specifying the decoding start timing is a vbv_delay.

9. A decoder which decodes bit-stream image data, the improvement being characterized by comprising:

a variable-length decoding device which carries out variable-length decoding with regard to the bit-stream data; and a controller which sends a decoding start instruction signal to the variable-length decoding device if completion information representing completion of output of the bit-stream data at the sender is detected.

10. The decoder as defined in claim 9, further comprising a detector which detects completion information representing the completion of output of bit-stream data at the sender of the bit-stream data.

11. The decoder as defined in claim 9, wherein the decoder is in compliance with the MPEG standard and the image data is in compliance with the MPEG standard.

12. The decoder as defined in claim 10, wherein if the detector does not detect the completion information, the controller outputs a decoding start instruction signal on the basis of the decoding start control operation that are executed according to the value of judgment calculated by use of time information for specifying decoding start timing and by use of a bit rate.

13. The decoder as defined in claim 12, further comprising a detection circuit for detecting the amount of data stored in the bit-stream buffer connected to the decoder, and the controller which performs decoding start control operation so as to send a decoding start instruction signal to the variable-length decoder unless the completion information signal, representing completion of output of bit-stream data at the sender of the bit-stream data, is detected on condition that the amount of data detected by the detection circuit is equal to or greater than the value of judgment that is calculated by use of time information for specifying decoding start timing and by use of a bit rate.

14. The decoder as defined in claim 12, wherein the variable-length decoder detects a bit rate from the bit-stream data and time information for specifying decoding start timing and sends the bit rate and the time information to the controller, and the controller comprises a calculator for calculating a value of judgment by use of the time information and the bit rate.

15. The decoder as defined in claim 13, wherein the image data is image information in compliance with the MPEG standard;

the value of judgment calculated by use of the time information specifying the decoding start timing and a bit rate, is the value of VBV occupancy; and the time information specifying the decoding start timing is a vbv_delay.

16. A decoding system for decoding bit-stream image data comprising the decoder as defined in claim 13, and a bit-stream buffer connected to a detection circuit of the decoder.

17. A decoding start controller which performs decoding start control operation when bit-stream data of image information is decoded, the improvement being characterized by comprising:

memory for storing a reduction of a value of judgment calculated by use of time information for specifying decoding start timing and by use of a bit rate;

a calculator which calculates the value of judgment calculated by use of time information for specifying decoding start timing and by use of a bit rate and calculates a corrected value by subtracting the reduction from the value of judgment calculated by use of the time information for specifying the decoding start timing and by use of a bit rate;

a comparator which compares the corrected value with the amount of data stored in the bit-stream buffer connected to the decoder provided with the decoding start signal controller; and an output device which outputs a decoding start instruction signal on the basis of comparison results produced by the comparator.

18. The decoding start controller as defined in claim 17, wherein, a decoding start instruction signal is output when the amount of data stored in the bit-stream buffer is equal to or greater than the corrected value.

19. The decoding start controller as defined in claim 17, wherein the image data is image information in compliance with the MPEG standard;

the value of judgment calculated by use of the time information specifying the decoding start timing and a bit rate, is the value of VBV occupancy; and the time information specifying the decoding start timing is a vbv_delay.

20. The decoding start controller as defined in claim 17, wherein the reduction is the amount of data stored in an internal local buffer within a decoder provided with the decoding start controller.

21. A decoder which decodes bit-stream image data, the improvement being characterized by comprising:

the decoding start controller as defined in claim 17, and a variable-length decoding device which carries out variable-length decoding with regard to the bit-stream data.

* * * * *